Jan. 26, 1971         F. R. HAUBER         3,557,564
UNIVERSAL OFFSHORE PIPELINE RISER CLAMP ASSEMBLY
Filed April 16, 1969         2 Sheets-Sheet 1
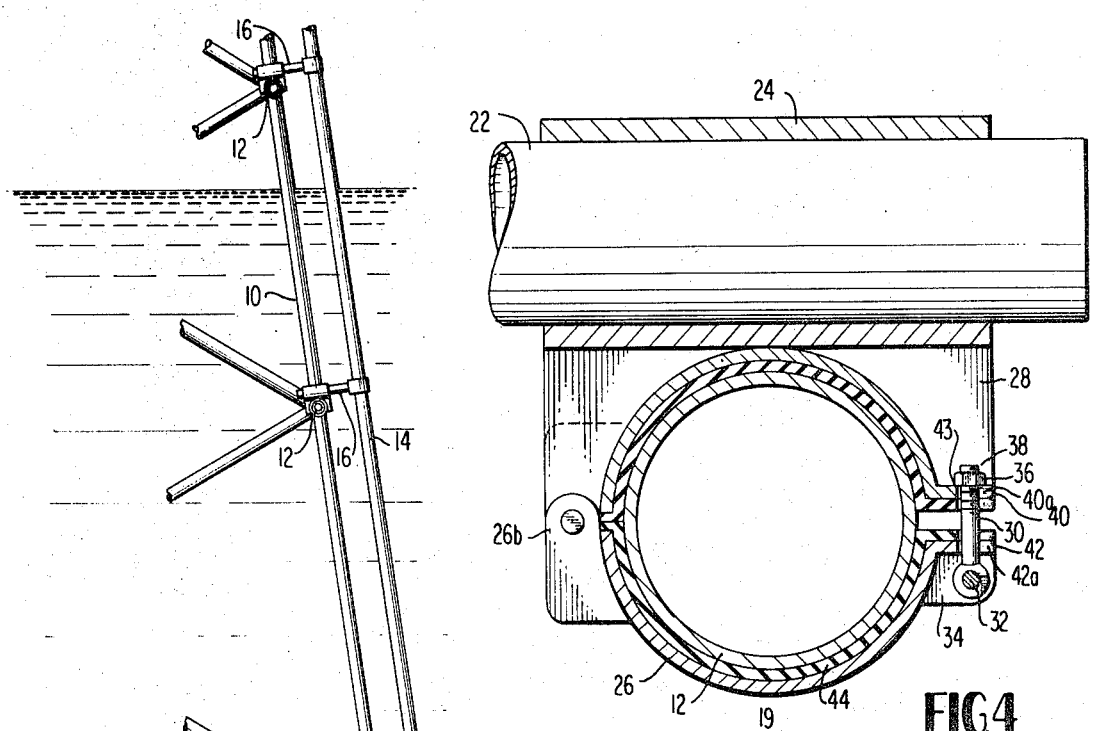
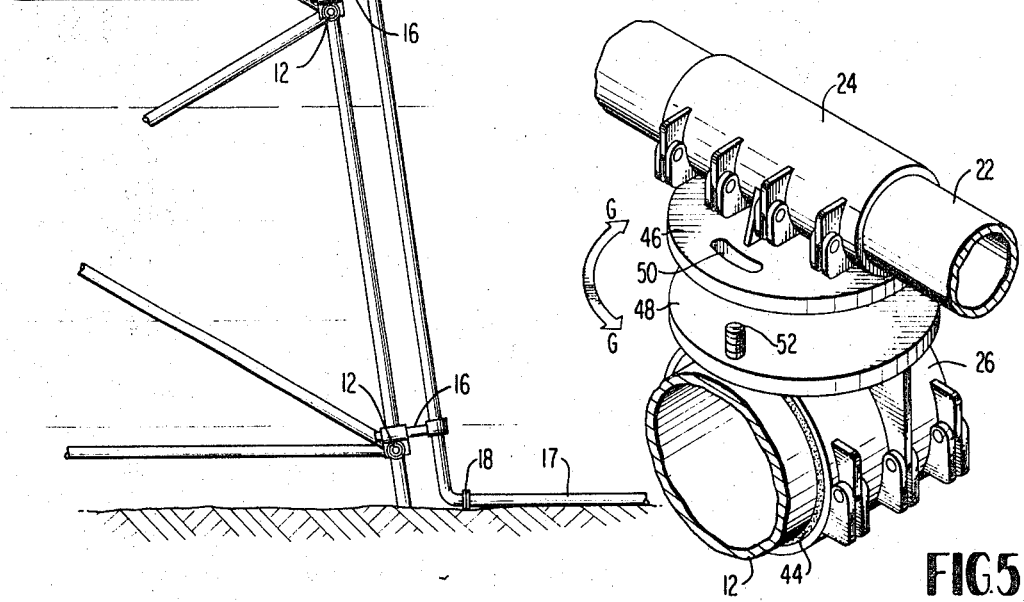
INVENTOR
FERDINAND R. HAUBER
BY Burns, Doane, Benedict, Swecker & Mathis
ATTORNEYS Jan. 26, 1971  F. R. HAUBER  3,557,564
UNIVERSAL OFFSHORE PIPELINE RISER CLAMP ASSEMBLY
Filed April 16, 1969  2 Sheets-Sheet 2

INVENTOR
FERDINAND R. HAUBER

BY Burns, Doane, Benedict, Swecker & Mathis

ATTORNEYS

United States Patent Office 3,557,564
Patented Jan. 26, 1971

3,557,564
UNIVERSAL OFFSHORE PIPELINE RISER CLAMP ASSEMBLY
Ferdinand R. Hauber, Galena Park, Tex., assignor to Brown & Root, Inc., Houston, Tex., a corporation of Texas
Filed Apr. 16, 1969, Ser. No. 816,511
Int. Cl. E21b *43/01*
U.S. Cl. 61—72.3      17 Claims

ABSTRACT OF THE DISCLOSURE

A clamping apparatus having at least two sleeve-like hinged clamps which are adjustably interconnected so as to be rotatable about a common axis to provide universal freedom of movement to elements loosely clamped therein. Each sleeve-like clamp may be fitted with a toggle bolt assembly to provide ease in securing, releasing and adjusting the clamped elements. The surfaces of the clamps which contact the clamped elements may be lined with an electrical insulating material.

BACKGROUND OF THE INVENTION

This invention relates to offshore pipeline equipment, and in particular, to an apparatus for mounting pipe on an offshore structure unit. In its more specific ramifications, the invention is directed to a clamping means and method for adjustably securing the riser pipe of an underwater pipeline to members of an offshore platform.

Recent developments in the petroleum and gas industries have resulted in a surge of activity in the field of underwater pipe laying. Such pipelines must be laid along the floor of the sea in relatively deep water to carry petroleum and gas production from remote wells to offshore gathering platforms and, in turn, from these platforms to shore installations. The pipe used in these applications may vary in diameter from 4 inches to 48 inches and, of course, the larger the pipe size, the more difficult it is to properly attach the pipeline to an offshore structure. The end portion of a pipeline which rises substantially vertically from the floor of the sea and which must be secured or clamped to an offshore platform is characterized in the trade as a "riser pipe" or "riser."

A significant percentage of the costly delays encountered in constructing such overall pipeline installations has been directly attributed to the operation of attaching the riser pipe to an offshore unit. To be more specific, the clamps presently used to secure a riser pipe to the structure members of an offshore platform are difficult to work with an are not adapted to provide a diver with the freedom of adjustment necessary to make fast and workmanlike connections.

The current practice of making these connections is one of prefabrication and involves the welding of a series of clamps, in fixed positions, at predetermined stand-off distances from a platform cross or leg member before the platform, itself, is erected at sea. When attaching a riser pipe to the platform, if the pipe does not properly fit the stand-off clamps all the way up the leg member due to misalignment or due to a misjudged stand-off distance, or, if an attending derrick barge is positioning the riser and sea movement jostles the barge at precisely the critical moment of pipe insertion into the open clamps, damage often results and the entire operation may have to be repeated.

In practice, unsuccessful attempts are occasionally made several times before a final connection is completed. Even then, the resulting connection may be crooked and may produce undesirable local stress in both the pipe and in the clamps. Naturally, if a riser pipe is itself, bent or bowed and is forced into rigidly mounted clamps which have been prealigned for straight piping, local stress will occur in both the clamps and the riser pipe. The resulting stress concentrations encourage corrosion activity and, at the same time, increase the likelihood of mechanical failure resulting from sea movement acting upon the riser pipe.

An additional problem, which does not appear to have been heretofore recognized in the field, is the increase of electrolytic activity caused by an electrical grounding of the cathodic protection system of a pipeline through the presently used clamps to a supporting offshore structure.

It is therefore an object of the present invention to provide a clamp assembly which permits the universal adjustment of elements held therein.

It is another object of the present invention to provide a clamping assembly which may be easily installed underwater by a diver without having to first rigidly premount any portion of the assembly on the supporting structure before the erection of that supporting structure.

It is still another object of the present invention to provide a universal clamp assembly for underwater applications which assembly prevents electrolytic breakdown between held elements.

It is still a further object of the present invention to provide a clamp for connecting riser pipe to an offshore platform without imposing undesired local stress on either the pipe or the clamps. It is a further object of the invention to provide a method for adjustably connecting a riser pipe with an offshore unit.

SUMMARY OF THE INVENTION

Briefly stated, the invention comprises a clamping assembly having at least two clamps rotatably connected by an intermediate member so that elements held within each clamp are provided with multi-directional freedom of pivotal movement upon loosing the clamps and rotating the clamps about the intermediate member. Both the clamps and the intermediate member may be locked in a fixed position after properly attaching the clamping member to a structure and after making any desired final adjustments.

In one feature of the invention, electrical insulation covers the clamping surfaces of the two clamps in order to electrically isolate one held element from the other.

In another feature of the invention, each clamp is provided with toggle bolt and gate hinge arrangements to facilitate clamping, adjusting, and releasing operations.

The invention further contemplates a method for connecting a riser pipe to an offshore unit using multi-directionally adjustable clamps. The clamps may be guided down a constructed riser pipe, attached, adjusted and locked in a final position. Alternatively, the clamps may be attached along an upright extension of the offshore unit and used as a guide for lowering and positioning the riser pipe. A crane may be used to support each clamp apart from the offshore unit and riser, in an estimated position with respect to both the offshore unit and the riser pipe while a diver makes all final adjustments and attachments.

DRAWINGS OF PREFERRED EMBODIMENTS

The invention is specifically pointed out and distinctly claimed in the concluding portion of the specification; however, the operation, structure, and further advantages of the preferred embodiment may be best understood by referring to the following description taken in connection with the accompanying drawings in which:

FIG. 1 shows an elevation view of a riser pipe properly secured to the cross members of an offshore platform by four clamping assemblies of the present invention;

FIG. 4 is a partial sectional elevation view of a double clamp member of the clamp assembly shown in FIG. 2 taken along line 4—4; and FIG. 5 is an isometric view of an alternative embodiment of the double clamp member shown in FIG. 4.

DETAILED DESCRIPTION

Figure 2:
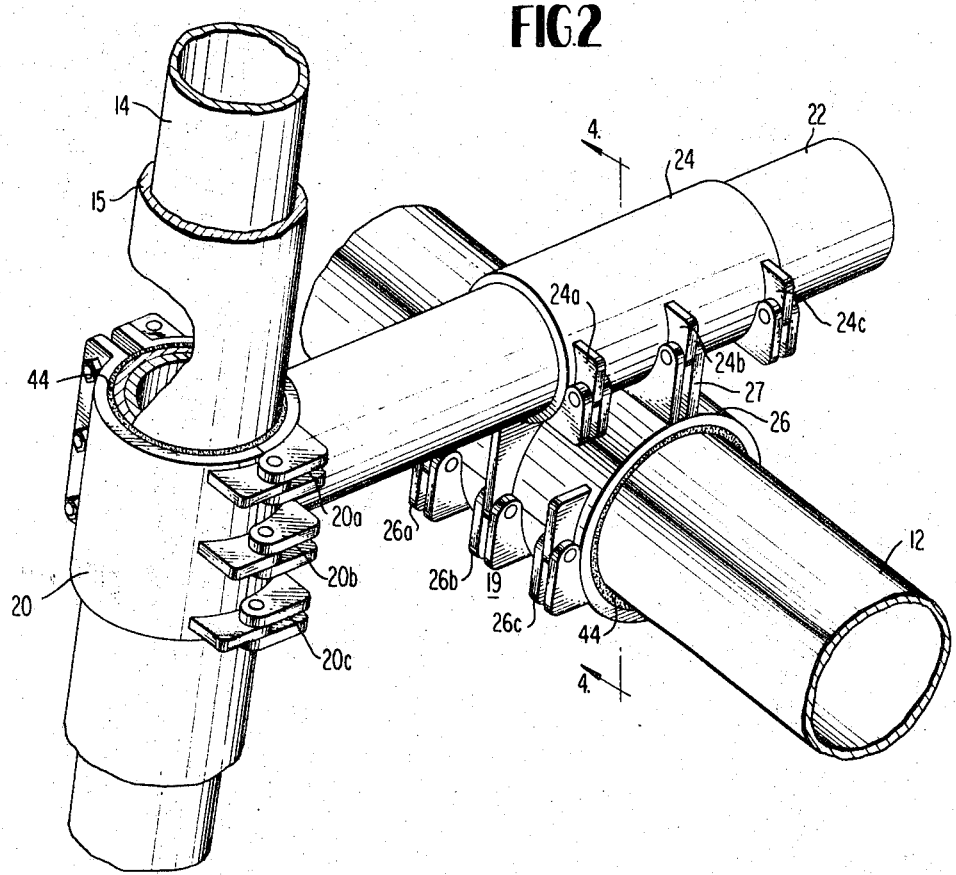
FIG. 2 is an isometric view of a preferred embodiment of the universal clamp assembly of the present invention.

Referring now to the drawings, in which like numerals are used to indicate like parts throughout the various views thereof, FIG. 1 shows the jacket of an offshore platform having leg 10 and horizontal cross members 12. A riser pipe 14, having a metallic shield 15 (shown in partial cross section in FIG. 2), is attached to the platform by the clamping assemblies 16 of the present invention. The metallic shield 15 may be applied to the riser pipe 14 on the platform, itself, before constructing the riser pipe installation. Generally, the shield 15 comprises a steel shield sleeve used to protect the riser pipe from rupture and, in this configuration, gives the overall pipe a composite construction. In the specific application shown in FIG. 1, a plurality of the clamping assemblies 16 are secured to the riser pipe 14, and each one of the clamping assemblies 16 is, in turn, mounted on a horizontal cross member 12 of the platform. The riser pipe 14 is formed with a J-shaped bend at its lower end which connects with a pipeline 17 disposed on the ocean floor. A flanged member 18 is used to attach the connected pipeline adjacent to the J-bend section of the riser.

FIG. 2 provides a detail view of the overall assembly of the preferred embodiment in its intended application of securing a riser pipe 14 to a platform cross member 12. As shown, this embodiment of the invention is usually mounted with its center of gravity over the cross member 12 as opposed to being supportingly hung thereunder.

The overall clamp assembly essentially comprises a double clamp member shown generally at 19, a single first clamp 20, and an interconnecting arm member 22. The arm 22 is rotatably held near one end thereof by a hollow cylindrical support member 24 of the double clamp member 19 and is rigidly mounted at the other end to the single first clamp 20. In this embodiment, the longitudinal axis of the clamp 20 is arranged normal to that of the arm member 22. The axis of the support member 24 of the double clamp 19 is arranged so as to be normal to that of both the clamp 20 and to that of a second clamp 26, which comprises one of the clamps comprising double clamp member 19. The support member 24, itself, comprises the other clamp of double clamp member 19 and, hence, may be referred to as a third clamp 24.

It can be seen that, by the above arrangement, both members 19 and 20 are rotatable about the longitudinal axis of the arm member 22. The first clamp 20 is used to make a first connection with the riser 14 while the clamp 26 is used to make a second connection with the platform cross member 12. It should be noted that the clamp 20 need not be secured before securing the clamp 26 merely because the former is referred to as a first clamp. Clamp 24 and the arm 22 supported therein comprise what is referred to as an intermediate member used to rotatably connect the clamps 20 and 26.

As shown in FIG. 2, the double clamp 19 consists of the two sleeve-like clamps 24 and 26 which are integrated into a single member by a connecting web plate 28. The plane of web plate 28 is normal to the longitudinal axis of the clamp 26 and is coincident with the axis of the clamp 24.

Each clamp 20, 24 and 26 comprises a pair of hollow, generally semi-cylindrical members, which are transversely, pivotally connected, respectively, by three conventional hinges 20a, 20b, 20c and 24a, 24b, 24c and 26a, 26b and 26c.

A lower portion 27 of the hinge 24b is welded to both the lower semi-cylindrical member of clamp 24 and to the upper such member of clamp 26 and is arranged in a plane normal to the web plate 28. By such an arrangement, the portion 27 of the hinge 24b cooperates with the web plate 28 to form a rigid cross-interlocking construction which provides substantial transverse strength to the cross-connection between the clamps 24 and 26.

Figure 3:
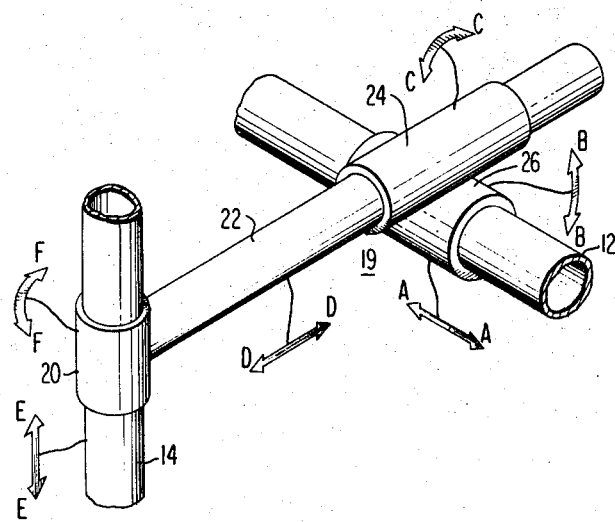
FIG. 3 is an isometric diagram showing the degrees of freedom allowed elements held within the clamping assembly shown in FIG. 2.

FIG. 3 shows the multi-directional freedom of movement available between the cross member 12 and the riser pipe 14. As shown, the double clamp member 19 may be moved linearly along the length of the cross member 12 in direction A—A which is transverse to the upright extension of the offshore platform and which permits the positioning of the riser 14 anywhere laterally along a vertical side of a platform. Consequently, the riser need not be restricted to a position immediately adjacent a leg member 10, but may be mounted intermediate any two leg members which are connected by a cross member. It should also be understood that the clamp assembly of the present invention need not be attached to a horizontal member of a platform but may be attached to a substantially vertical leg member or to a diagonal member if such member be conveniently located and of sufficient strength to offer the necessary support, if so desired.

By rotating the double clamp member 19 about the axis of the cross member 12, in direction B—B, the riser may be rotated within its axial plane so as to adjust the angle of the riser axis with respect to the ocean floor and also with respect to the upright extension or batter of the offshore platform.

When the arm member 22 is loosely held within member 24, it is rotatable therein about its own axis. It should be noted therefore, that the intermediate arm member 22 defines the general axis of the overall clamp assembly, in that the remaining elements of the assembly (i.e. double clamp member 19 and the clamp 20) are rotatable about the axis thereof in direction C—C.

This freedom of movement in direction C—C permits a diver to rotate the riser 14 within its axial plane about the axis of the arm member 22. Consequently, the angle of the riser axis with respect to the ocean floor may be adjusted in a plane generally parallel to the side of an offshore platform and to the upright extension or batter thereof.

When the arm member 22 is loosely held within clamp member 24, it also provides freedom of movement to the riser 14 in the inward/outward direction D—D. The standoff distance between the platform and the riser 14 may thusly be adjusted at increments along the upright extension or batter of the platform.

The clamp 20 adjustably holds the riser 14 therein so as to permit the riser freedom of movement in the lineal direction E—E and also in the rotational direction F—F about the axis thereof. Adjustment in direction E—E permits a diver to position the clamp 20 linearly (generally vertically), along the riser pipe 14 which adjustment may become necessary when adjusting the riser pipe in direction B—B. Likewise, in some installations, the clamp 20 may be used as a guide for sliding the riser 14 down therethrough after properly locking the remaining clamping members with each other and with the appropriate structural members of the platform. Rotating the riser pipe 14 within clamp 20 in direction F—F is often necessary when threadedly engaging two sections of riser pipe upon construction of an overall installation.

FIG. 4 provides a partial cross sectional view of the double clamp member 18, as shown in FIG. 2, taken along a line perpendicular to the axis of the cross member 12 and coincident with the axis of the arm 22.

As has been mentioned in the background material of the specification, it is important to be able to properly secure riser pipe clamps with relative ease in underwater applications. To aid a diver in performing this difficult operation, the present invention contemplates locking the semi-cylindrical members of clamps 20, 24 and 26 through the use of quick release toggle bolt assemblies mounted on the clamps 20, 24 and 26 with one toggle bolt assembly mounted opposite each hinge.

Each toggle bolt assembly, as exemplified in FIG. 4, includes a bolt 30 pivotally secured to each associated clamp 20, 24 and 26 by means of a pin 32 inserted through the bolt 30 and through a projection 34 formed on the lower semi-cylindrical member of each associated clamp. A nut 36 is provided which may be made non-removable from the bolt 30 by expanding the end 38 of the bolt 30 after the nut has been turned down a few threads. The expansion may be accomplished by merely hammering the end 38 of the bolt 30 so that the diver cannot accidentally entirely remove the nut 36 from the end of the bolt 30 while loosening a clamp connection for an adjustment.

Slots 40a and 42a are provided in flanges 40 and 42, respectively. These slots are formed on the non-hinged or "free" longitudinal edges of each of the semi-cylindrical members of the clamps 20, 24 and 26. The slots are configured so that the bolt 30 is in proper locking position when it is fully inserted and contacts flush against the closed end 43 of the slot 40a. Of course, the slot could be made wider at the mouth in order to facilitate the insertion of the bolt 30.

An electrical insulator liner 44, (e.g. neoprene) may be attached by vulcanizing to the contact surfaces of the clamps 20 and 26 which are to make first and second connections with the riser pipe 14 and the cross member 12, respectively, (see FIG. 2). The purpose of the liner 44 is to insulate a pipeline from the mounting offshore platform so as to prevent corrosion due to the grounding of a cathodic protection system of the pipeline.

FIG. 5 shows an alternative embodiment of the present invention which is directed to a modification with respect to the double clamp member 19 exemplified in FIG. 2. In this modification, the clamps 24 and 26 are themselves, rotatably connected with respect to each other about an axis normal to their respective axes. For this purpose, two disc-like plates 46 and 48 are provided and are welded to the bottom of clamp 24 and the top of clamp 26, respectively. The plates 46 and 48 are disposed in slidable engagement with the upper surface of plate 48 supporting the undersurface of plate 46. The plates comprise what is referred to as a second intermediate member used for rotatably connecting the clamps 24 and 26.

The plate 46 is formed with two arcuate slots 50 (only one slot shown) located 180° apart and coincident with a minor concentric circle described within the circumference of the outer periphery of the plate 46. The plate 48 is provided with two threaded studs 52 (only one stud shown) mounted perpendicular to the plane of the plates 46 and 48 and arranged to slidably fit within the arcuate slots 50.

The clamps 24 and 26 are fitted with the same hinge gate and toggle bolt assemblies as in the embodiment shown in FIGS. 2 and 4. Neoprene lining 44 may likewise be used in this alternative embodiment as in the embodiment shown in FIG. 2, to electrically isolate the platform cross member 12 from the riser pipe 14.

In underwater applications, a diver may rotate the clamps 24 and 26 through the arc described by the slots 50 while adjusting the overall clamp assembly. This arrangement provides an additional degree of freedom, G—G about an axis normal to that of both clamps 24 and 26. If it should be desired to position the riser pipe 14 laterally beyond the length of the cross member 12, the arm 22 may be cocked to the side to describe any desired angle with respect to the axis of the cross member and thereby the support provided by the arm 22 may be projected beyond the lateral extension of the cross member 12.

TECHNIQUES FOR MOUNTING RISER PIPE ON OFFSHORE UNITS

When making a riser connection using an apparatus according to the present invention, a diver is provided with a great degree of flexibility. Using one technique, the clamp assemblies may be roughly pre-installed at estimated positions along each length of riser pipe section as the pipe is being installed. After the completed overall riser has been properly placed in a rough final position with respect to the offshore platform, the diver can make the necessary fine adjustments.

Alternatively, a crane may be used to post-install the clamp members by lowering each clamp assembly to the diver. The crane, thereby, supports the assemblies in a roughly estimated position with respect to both the platform and the overall riser pipe and the diver makes the final adjustments. The crane may be mounted on the offshore platform, itself, or may be carried by an attending derrick barge.

Using another technique, the riser pipe, itself, may be used as a guide for sliding the clamp assemblies down to a diver by loosely attaching the clamp member 20 of each clamp assembly to the riser. Conversely, a plurality of clamp assemblies may be attached to a platform along the upright extension thereof and the clamp member 20 of each clamp assembly used as a means for guiding an entirely constructed length of riser pipe down into an estimated position. The diver then, as in the above-mentioned techniques, makes the final adjustments.

After the pipe and the clamp assemblies of the present invention have been roughly positioned and after the diver has determined what adjustments are to be made, the overall riser and associated clamp assemblies may be easily worked to a final position. If the riser must be rotated axially with respect to its own axis and parallel to the upright extension of the platform, the diver must loosen the clamp members 24 to rotate the arm 22, and must also loosen the clamp members 26 at the top and bottom cross members 12 of the platform in order to slide the assemblies at these positions linearly along the cross members 12 in opposite directions, respectively, at the top and bottom.

To rotate the riser axially with respect to its own axis in a direction perpendicular to the platform, the clamp members 24 at the top and bottom of the riser must be loosened and the arms 22 held therein moved inward and outward at the top and bottom with respect to the platform, respectively. After this adjustment, it may also be necessary to rock each clamp assembly about the axis of the associated cross member 12 to align the clamp members 20 with respect to the new angle described by the axis of the adjusted riser. This operation would be especially helpful if it were determined that the J-bend portion of the riser at the bottom thereof need be moved inward or outward for a connection with the pipeline 17 or with the clip-like member 18.

The riser may be moved axially up or down the upright extension of the platform or rotated about its own axis by loosening the clamps 20 and appropriately moving the riser therein. This adjustment is especially useful in threadedly engaging sectional lengths of pipe and in guiding the pipe vertically down into place alongside the platform.

It should be noted that, although horizontal cross members 12 are used for the purpose of explaining the preferred embodiment, the members 12 may be oriented in any direction (e.g. diagonally, vertically or horizonally). Likewise, when clamping very large riser pipes (e.g. 30" OD and larger), it may be desirable to clamp the single clamp 20 onto a leg member 10 and the clamp 26 onto the riser. This is the reverse of the connection shown in the preferred embodiment and is used when stronger, stiffer support is needed from the jacket. Similarly, it should be understood, that in adjusting the riser after roughly positioning the clamp assemblies, *all* the clamps 20, 24 and 26 may be loosened on all the assemblies and the diver, with the power of the derrick barge crane, may then rock the riser into any attitude desired, and end up with a straight alignment of clamps free of locked in stresses.

It can thus be seen that a clamp assembly and a method for using the assembly have been herein described which assembly provides a universal adqustment capabitliy with respect to elements clamped therein. The locking and hinging features of the clamp assembly make it especially useful in underwater applications where a diver must make pipe connections without the benfiit of a substantial amount of auxiliary alignment equipment. Since the assembly may be installed at sea, the present invention precludes the need for prefabricating the structural members of an offshore structure with rigidly mounted clamps before the offshore structure, itself, is erected at sea.

If the pipe should become bowed or bent due to the interaction of the sea on the riser pipe, the clamp assembly of the present invention may be adjusted to compensate which will thus prevent the buildup of undesirable local stress and help avert the eventual failure of the clamping assemblies. The incidence of mechanical failure and the degree of corrosion due to stress concentrations are thereby reduced.

Through the use of the present invention, riser pipe may be constructed at sea in common pipe length sections or an entire length of riser pipe may be guided down the side of an offshore structure along any upright extension thereof, and not necessarily along a leg member. With the overall flexibility provided, safer and faster pipe laying operations are possible. Further, by lining the contact surfaces of the clamp assembly with an electrical insulator, the grounding of a pipeline cathodic protection system from a pipeline to an offshore structure is precluded.

While what has been shown is a preferred embodiment of the invention and one modification thereof, it is, of course, understood that various modifications and changes may be made therein without departing from the substance thereof and so it is intended to cover in the following claims all such devices as fall within the true spirit and scope of the present invention.

What I claim and seek to obtain by Letters Patent of the United States is:

1. A riser pipe and offshore platform installation comprising:
    (a) a riser pipe;
    (b) an offshore platform having upright members and cross members;
    (c) clamping means for connecting said riser pipe to said offshore platform;
    (d) said clamping means comprising at least one multi-directionally adjustable clamp assembly;
    (e) each said at least one multi-directionally adjustable clamp assembly comprising:
        (1) a first clamp secured to said riser pipe;
        (2) a second clamp secured to one of said upright and cross-sectional members;
        (3) a first intermediate member rotatably connecting said first and said second clamps;
        (4) means for locking said first intermediate member in one position;
        (5) means for locking said first clamp onto said riser pipe;
        (6) means for locking said second clamp onto one of said upright and cross members;
        (7) hinge means mounted on each of said first and said second clamps for supporting said first and said second clamps as each is opened for the insertion of one of said upright members and said cross members and said riser pipe; and
        (8) each of said first and said second clamps being openable along a longitudinal side thereof so that one of said upright members and said cross members and said riser pipe may be inserted into each of said first and said second clamps in a direction substantially normal to the longitudinal axis thereof.

2. A riser pipe and offshore platform installation according to claim 1 wherein:
    said riser pipe is rotatable within its axial plane upon loosening said means for locking said first intermediate member.

3. The riser pipe and offshore platform installation according to claim 1 wherein:
    said riser pipe is rotatable about each of said cross members upon loosening said means for locking said second clamp.

4. A riser pipe and offshore platform installation according to claim 1 wherein said first intermediate member rotatably connecting said first and said second clamps comprises:
    (a) an arm member;
    (b) a hollow cylindrical support means for rotatably holding said arm member at one end thereof;
    (c) said hollow cylindrical support means being mounted on said second clamp and arranged with the longitudinal axis of said second clamp substantially normal to the longitudinal axis of said hollow cylindrical support means;
    (d) means for locking said arm member within said hollow cylindrical support means so as to prevent rotation and linear movement of said arm member with respect to said support means;
    (e) the other end of said arm member being rigidly secured to said first clamp;
    (f) the longitudinal axis of said arm member being substantially normal to the longitudinal axis of said first clamp;
    (g) said riser pipe being rotatable in its axial plane about the axis of said arm member upon loosening said hollow cylindrical support means.

5. A riser pipe and offshore platform installation according to claim 1 wherein said riser pipe is rotatable about its own axis within said first clamp upon loosening said means for locking said first clamp.

6. A riser pipe and offshore platform installation according to claim 1 wherein said riser pipe is adjustable linearly through said first clamp in the up/down direction upon loosening said means for locking said first clamp.

7. A riser pipe and offshore platform installation according to claim 4 wherein:
    (a) said second clamp and said hollow cylindrical support means for said arm member are rotatably connected by a second intermediate member;
    (b) said second intermediate member having an axis of rotation;
    (c) said riser pipe being adjustable about the axis of said second intermediate member.

8. A riser pipe and offshore platform installation according to claim 4 wherein said riser pipe is adjustable in the inward/outward direction from said offshore platform by the linear movement of said arm member within said hollow cylindrical support means upon loosening said hollow cylindrical support means.

9. A method for adjustably attaching a riser pipe to an offshore platform comprising the steps:
    (a) providing a double clamp member;
    (b) clamping one clamp of the double clamp member to a cross member of the offshore platform;
    (c) clamping an elongated cylindrical arm member in the other clamp of the double clamp member at one end of the arm member;
    (d) providing a single clamp at the other end of the arm member with the axis of the single clamp normal to that of the arm member;
(e) clamping a riser pipe within the single clamp;
(f) loosening all the clamps;
(g) adjusting the riser into a desired position; and
(h) locking all the clamps.

10. A method for adjustably attaching a riser pipe to an offshore platform comprising the steps:
(a) providing a double clamp member having two hollow cylindrical clamps rotatably connected with each other;
(b) providing the double clamp member with means for locking the two hollow cylindrical clamps against rotation between the two;
(c) clamping one clamp of the double clamp member to a cross member of the offshore platform;
(d) clamping an elongated cylindrical arm member in the other clamp of the double clamp member at one end of the arm member;
(e) providing a single clamp at the other end of the arm member with the axis of the single clamp normal to that of the arm member;
(f) clamping a riser pipe within the single clamp;
(g) loosening all the clamps and the means for locking the two hollow cylindrical clamps against rotation between the two;
(h) adjusting the riser pipe into a desired position; and
(i) locking all the clamps and the means for locking the two hollow cylindrical clamps against rotation between the two.

11. A method for adjustably attaching a riser pipe to an offshore platform comprising the steps:
(a) providing a double clamp member;
(b) clamping one clamp of the double clamp member to a cross member of the offshore platform;
(c) clamping an elongated cylindrical arm member in the other clamp of the double clamp member at one end of the arm member;
(d) providing a single clamp at the other end of the arm member with the axis of the single clamp normal to that of the arm member;
(e) clamping a riser pipe within the single clamp;
(f) loosening all the clamps necessary to move the riser pipe into a final desired position;
(g) adjusting the riser pipe into the final desired position; and
(h) locking all the loosened clamps.

12. A method for adjustably attaching a riser pipe to an offshore platform comprising the steps:
(a) providing a double clamp member having two hollow cylindrical clamps rotatably connected with each other;
(b) providing the double clamp member with means for locking the two hollow cylindrical clamps against rotation therebetween;
(c) clamping one clamp of the double clamp member to a cross member of the offshore platform;
(d) clamping an elongated cylindrical arm member in the other clamp of the double clamp member at one end of the arm member;
(e) providing a single clamp at the other end of the clamp member with the axis of the single clamp normal to that of the arm member;
(f) clamping a riser pipe in the single clamp;
(g) loosening all the clamps and the means for locking the two hollow cylindrical clamps against rotation therebetween necessary to move the riser pipe into a final desired position;
(h) adjusting the riser pipe into the final desired position; and
(i) locking all the loosened clamps and means for locking the two hollow cylindrical clamps against rotation therebetween.

13. A method for attaching a riser pipe to an offshore platform using multi-directionally adjustable clamp assemblies comprising the steps:
(a) attaching one clamp of at least one multi-directionally adjustable clamp assembly to an offshore platform along an upright extension thereof;
(b) using another clamp of the at least one clamp assembly as a guide for sliding the riser pipe down therethrough into an estimated final position;
(c) loosening the clamps of the clamp assembly necessary to move the riser pipe into a precise final desired position;
(d) adjusting the riser pipe into the precise final desired position; and
(e) locking all the clamps which have been loosened.

14. A method for attaching a riser pipe to an offshore platform using multi-directionally adjustable clamps comprising the steps:
(a) attaching one clamp of at least one multi-directionally adjustable clamp assembly to a riser at a location on the riser estimated to be a final position;
(b) lowering the riser pipe into a rough final position;
(c) loosening the at least one multi-directionally adjustable clamp assembly with respect to the riser pipe;
(d) loosely attaching the at least one clamp assembly to the offshore platform along an upright extension thereof;
(e) adjusting the riser pipe into a final precise desired position; and
(f) locking all the clamps to maintain the riser pipe in the precise final position.

15. A method for attaching a riser pipe to an offshore platform using multi-directionally adjustable clamps comprising the steps:
(a) lowering a riser pipe to be attached to the offshore platform;
(b) roughly positioning the riser pipe in an estimated final position;
(c) lowering at least one multi-directionally adjustable clamp assembly;
(d) supporting the at least one multi-directionally adjustable clamp assembly in an estimated final position with respect to both the riser pipe and the offshore platform;
(e) loosely connecting the multi-directionally adjustable clamp assembly with both the riser pipe and the platform;
(f) adjusting the riser pipe and the at least one multi-directionally adjustable clamp assembly into a final precise position; and
(g) locking all the clamps so as to secure the riser pipe in the final precise position.

16. A method for adjustably attaching a riser pipe to an offshore platform comprising the steps:
(a) providing a double clamp member;
(b) clamping one clamp of the double clamp member to the riser pipe;
(c) clamping an elongated cylindrical arm member in the other clamp of the double clamp member at one end of the arm member;
(d) providing a single clamp at the other end of the arm member with the axis of the single clamp normal to that of the arm member;
(e) clamping a leg member of the offshore platform within the single clamp;
(f) loosening all the clamps necessary to move the riser pipe into a final desired position;
(g) adjusting the riser pipe into the final desired position; and
(h) locking all the loosened clamps.

17. A riser pipe and offshore platform installation comprising:
(a) a riser pipe;
(b) an offshore platform having upright leg members and cross members;

(c) clamping means for connecting said riser pipe to said offshore platform;
(d) said clamping means comprising at least one multi-directionally adjustable clamp assembly;
(e) each said at least one multi-directionally adjustable clamp assembly comprising:
  (1) a first clamp secured to one of said upright leg members of said offshore platform;
  (2) a second clamp secured to said riser pipe;
  (3) an intermediate support member rotatably connecting said first and said second clamp;
  (4) means for locking said intermediate support member in one position;
  (5) means for locking said first clamp onto said upright leg member;
  (6) means for locking said second clamp onto said riser;
  (7) hinge means mounted on each of said first and said second clamps for supporting said first and said second clamps as each is opened for the insertion of one of said upright leg members and said riser pipe respectively;
  (8) each of said first and said second clamps being openable along a longitudinal side thereof so that one of said upright leg members and said riser pipe may be inserted into each of said first and said second clamps in a direction substantially normal to the longitudinal axis thereof.

References Cited

UNITED STATES PATENTS

| | | | |
|---|---|---|---|
| 3,025,089 | 3/1962 | Ramsden | 287—54 |
| 3,376,708 | 4/1968 | Hindman | 61—72.3 |
| 3,219,119 | 11/1965 | Matthews | 61—72.3X |
| 3,226,728 | 12/1965 | Walvoord | 61—72.3X |
| 3,434,296 | 3/1969 | Otteman et al. | 61—72.3 |
| 3,466,882 | 9/1969 | Broussard et al. | 61—72.3 |

J. KARL BELL, Primary Examiner

U.S. Cl. X.R.

61—46; 166—.5; 287—54

PO-1050
(5/69)

UNITED STATES PATENT OFFICE
CERTIFICATE OF CORRECTION

Patent No. 3,557,564      Dated    January 26, 1971

Inventor(s) Ferdinand R. Hauber

It is certified that error appears in the above-identified patent and that said Letters Patent are hereby corrected as shown below:

In Column 7, line 62, following "cross" delete --sectional --.

Signed and sealed this 25th day of May 1971.

(SEAL)
Attest:

EDWARD M. FLETCHER, JR.            WILLIAM E. SCHUYLER, JR.
Attesting Officer                    Commissioner of Patents